(12) United States Patent
Huang et al.

(10) Patent No.: US 10,237,272 B2
(45) Date of Patent: Mar. 19, 2019

(54) METHODS, APPARATUS, AND SYSTEMS FOR IDENTITY AUTHENTICATION

(71) Applicant: ALIBABA GROUP HOLDING LIMITED, George Town, Grand Cayman (KY)

(72) Inventors: Mian Huang, Hangzhou (CN); Yan Xu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 81 days.

(21) Appl. No.: 15/051,478

(22) Filed: Feb. 23, 2016

(65) Prior Publication Data

US 2016/0248771 A1    Aug. 25, 2016

(30) Foreign Application Priority Data

Feb. 25, 2015  (CN) .......................... 2015 1 0087898

(51) Int. Cl.
*H04L 29/06* (2006.01)

(52) U.S. Cl.
CPC .............................. *H04L 63/0876* (2013.01)

(58) Field of Classification Search
CPC .................................................. H04L 63/0876
(Continued)

(56) References Cited

U.S. PATENT DOCUMENTS

| 5,659,616 A | * | 8/1997 | Sudia | ................... | G06Q 20/341 |
| | | | | | 380/30 |
| 7,489,930 B2 | | 2/2009 | Aerrabotu et al. | | |

(Continued)

FOREIGN PATENT DOCUMENTS

| CN | 101217396 A | 7/2008 |
| WO | WO 2016/138009 A1 | 9/2016 |

OTHER PUBLICATIONS

PCT International Search Report and Written Opinion dated May 3, 2016, issued in corresponding International Application No. PCT/US2016/019153 (16 pages).

(Continued)

*Primary Examiner* — Jacob Lipman
(74) *Attorney, Agent, or Firm* — Finnegan, Henderson, Farabow, Garrett & Dunner, LLP (57) ABSTRACT

An identity authentication method is provided. The method comprises receiving request information transmitted by an online terminal device for determining neighbor network devices and determining at least one neighbor network device of the online terminal device according to the request information, identifying at least one credible neighbor network device of the online terminal device from the at least one neighbor network device and identifying at least one weighted neighbor network device of the online terminal device from the at least one neighbor network device, and computing a credibility score of the online terminal device according to a number of the credible neighbor network device and a number of the weighted neighbor network device, generating authentication notification information according to the credibility score, the authentication notification information indicating whether the online terminal device passes identity authentication, and transmitting the authentication notification information to the online terminal device.

31 Claims, 6 Drawing Sheets

(58) Field of Classification Search
USPC .......................................................... 726/4
See application file for complete search history.

(56) References Cited

U.S. PATENT DOCUMENTS

| | | |
|---|---|---|
| 7,793,104 B2 | 9/2010 | Zheng et al. |
| 2004/0049586 A1 | 3/2004 | Ocepek et al. |
| 2004/0240669 A1 | 12/2004 | Kempf et al. |
| 2005/0050004 A1 | 3/2005 | Sheu et al. |
| 2007/0192488 A1 | 8/2007 | DaCosta |
| 2007/0203781 A1 | 8/2007 | Kerschbaum et al. |
| 2007/0208934 A1 | 9/2007 | Heffez |
| 2008/0065888 A1 | 3/2008 | Zheng et al. |
| 2009/0060200 A1 | 3/2009 | Sheu et al. |
| 2010/0211996 A1 | 8/2010 | McGeehan et al. |
| 2012/0327933 A1 | 12/2012 | Retana et al. |
| 2013/0133023 A1* | 5/2013 | Burstein .................. G06F 21/00 726/1 |
| 2014/0033306 A1 | 1/2014 | Huang |
| 2014/0140227 A1 | 5/2014 | Gao et al. |
| 2014/0150058 A1 | 5/2014 | Baig et al. |
| 2014/0189808 A1 | 7/2014 | Mahaffey et al. |
| 2015/0279134 A1 | 10/2015 | Warren |

OTHER PUBLICATIONS

First Chinese Office Action issued in Chinese Application No. 201510087898.5, dated Aug. 20, 2018 (18 pages).
First Chinese Search Report issued in Chinese Application No. CN201510087898.5, dated Aug. 9, 2018 (2 pages).
Extended European Search Report pursuant to Rule 62 EPC, the Supplementary European Search Report (Art. 153(7) EPC) and the European Search Opinion issued in EPO Application No. 16756197.6-1218/3262552 dated Feb. 20, 2018 (6 pages).

* cited by examiner

METHODS, APPARATUS, AND SYSTEMS FOR IDENTITY AUTHENTICATION

CROSS REFERENCE TO RELATED APPLICATION

The present application claims the benefits of priority to Chinese Application No. 201510087898.5, filed Feb. 25, 2015, the entire contents of which are incorporated herein by reference.

TECHNICAL FIELD

The present application relates to network device authentication, and more particularly, to methods and apparatus for identity authentication.

BACKGROUND

Users are frequently requested to be authenticated while accessing internet from terminal devices. Main reasons for the authentication are to protect user privacy and personal assets and to maintain a high level of cyber security. As a result, the execution of many operations, such as making an online payment, downloading from a certain database, or using a personal account, usually requires confirmation of the user's identity.

Present online authentication technologies often rely on terminal device binding. For example, the identity of the user is tied to a terminal device connected to the network by logging into a personal account on the terminal device and the terminal device is verified by installed digital certificates. As shown here, the user's identity is verified through the ownership of the terminal device.

However, such practice had low flexibility in situations when the ownership alters. For example, when the user buys a new computer, he/she cannot perform all operations mentioned above on this new device until digital certificates are installed, and the installation can be inconvenient and burdensome.

SUMMARY

One aspect of the present disclosure is directed to an identity authentication method. The method comprises receiving request information transmitted by an online terminal device for determining neighbor network devices and, determining at least one neighbor network device of the online terminal device according to the request information, identifying at least one credible neighbor network device of the online terminal device from the at least one neighbor network device and identifying at least one weighted neighbor network device of the online terminal device from the at least one neighbor network device, and computing a credibility score of the online terminal device according to a number of the credible neighbor network device and a number of the weighted neighbor network device, generating authentication notification information according to the credibility score, the authentication notification information indicating whether the online terminal device passes identity authentication, and transmitting the authentication notification information to the online terminal device.

Another aspect of the present disclosure is directed to a method for identity authentication. The method comprises transmitting request information for determining at least one neighbor network device to a server, receiving authentication notification information transmitted by the server, the authentication notification information indicating whether the online terminal device passes identity authentication and the authentication notification information being information generated by the server according to a credibility score of the online terminal device computed according to a number of credible neighbor corresponding to the online terminal device and a number of weighted neighbor network device corresponding to the online terminal device, and displaying the authentication notification information, enabling a user to receive the authentication notification information.

Another aspect of the present disclosure is directed to an identity authentication apparatus. The apparatus comprises a receiving unit configured to receive request information transmitted by an online terminal device for determining neighbor network devices and, determine at least one neighbor network device of the online terminal device according to the request information, an identification unit configured to identify at least one credible neighbor network device of the online terminal device from the at least one neighbor network device and to identify at least one weighted neighbor network device of the online terminal device from the at least one neighbor network device, and an authentication unit configured to compute a credibility score of the online terminal device according to a number of the credible neighbor network device and a number of the weighted neighbor network device, to generate authentication notification information according to the credibility score, the authentication notification information indicating whether the online terminal device passes identity authentication, and to transmit the authentication notification information to the online terminal device.

Another aspect of the present disclosure is directed to an apparatus for identification authentication. The apparatus comprises a transmitting unit configured to transmit request information for determining at least one neighbor network device to a server, a receiving unit configured to receive authentication notification information transmitted by the server, the authentication notification information indicating whether the online terminal device passes identity authentication and the authentication notification information being information generated by the server according to a credibility score of the online terminal device computed according to a number of credible neighbor corresponding to the online terminal device and a number of weighted neighbor network device corresponding to the online terminal device, and a display unit configured to display the authentication notification information, enabling a user to receive the authentication notification information.

Another aspect of the present disclosure is directed to a server. The server comprises a processor, and a non-transitory computer-readable storage medium storing instructions. The instructions, when executed by the processor, cause the processor to receive request information transmitted by an online terminal device for determining neighbor network devices and, determining at least one neighbor network device of the online terminal device according to the request information, identify at least one credible neighbor network device of the online terminal device from the at least one neighbor network device and identify at least one weighted neighbor network device of the online terminal device from the at least one neighbor network device, and compute a credibility score of the online terminal device according to a number of the credible neighbor network device and a number of the weighted neighbor network device, generate authentication notification information according to the credibility score, the authentication notification information indicating whether the online terminal device passes identity authentication, and transmit the authentication notification information to the online terminal device.

Another aspect of the present disclosure is directed to a terminal device. The terminal device comprises a processor, and a non-transitory computer-readable storage medium storing instructions. The instructions, when executed by the processor, cause the processor to transmit request information for determining at least one neighbor network device to a server, receive authentication notification information transmitted by the server, the authentication notification information indicating whether the online terminal device passes identity authentication and the authentication notification information being information generated by the server according to a credibility score of the online terminal device computed according to a number of credible neighbor corresponding to the online terminal device and a number of weighted neighbor network device corresponding to the online terminal device, and display the authentication notification information, enabling a user to receive the authentication notification information.

A further aspect of the present disclosure is directed to a method for identity authentication. According to one embodiment, the identity authentication method comprises receiving request information transmitted by an online terminal device for determining at least one neighbor network device of the online terminal device according to the request information, determining the at least one neighbor network device of the online terminal device according to the request information, determining a number of credible neighbor network device of the online terminal device from the at least one neighbor network device, and determining whether the online terminal device passes identity authentication based on the number of credible neighbor network device.

A further aspect of the present disclosure is directed to a method for identity authentication. According to one embodiment, the identity authentication method comprises receiving request information transmitted by an online terminal device for determining at least one neighbor network device of the online terminal device according to the request information, determining the at least one neighbor network device of the online terminal device according to the request information, determining a number of weighted neighbor network device of the online terminal device from the at least one neighbor network device, and determining whether the online terminal device passes identity authentication based on the number of credible neighbor network device.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Although terms "first", "second", "third" and the like may be adopted in the present application to describe various kinds of information, such information should not be limited by these terms. These terms are only used for distinguishing information of the same kind. For example, under the situation of not departing from the range of the present application, first information may also be called as second information. Similarly, second information may also be called as first information. Depending on the context, the word "if" which is used here can be explained as "while", "when" or "in response to determination."

Figure 1:
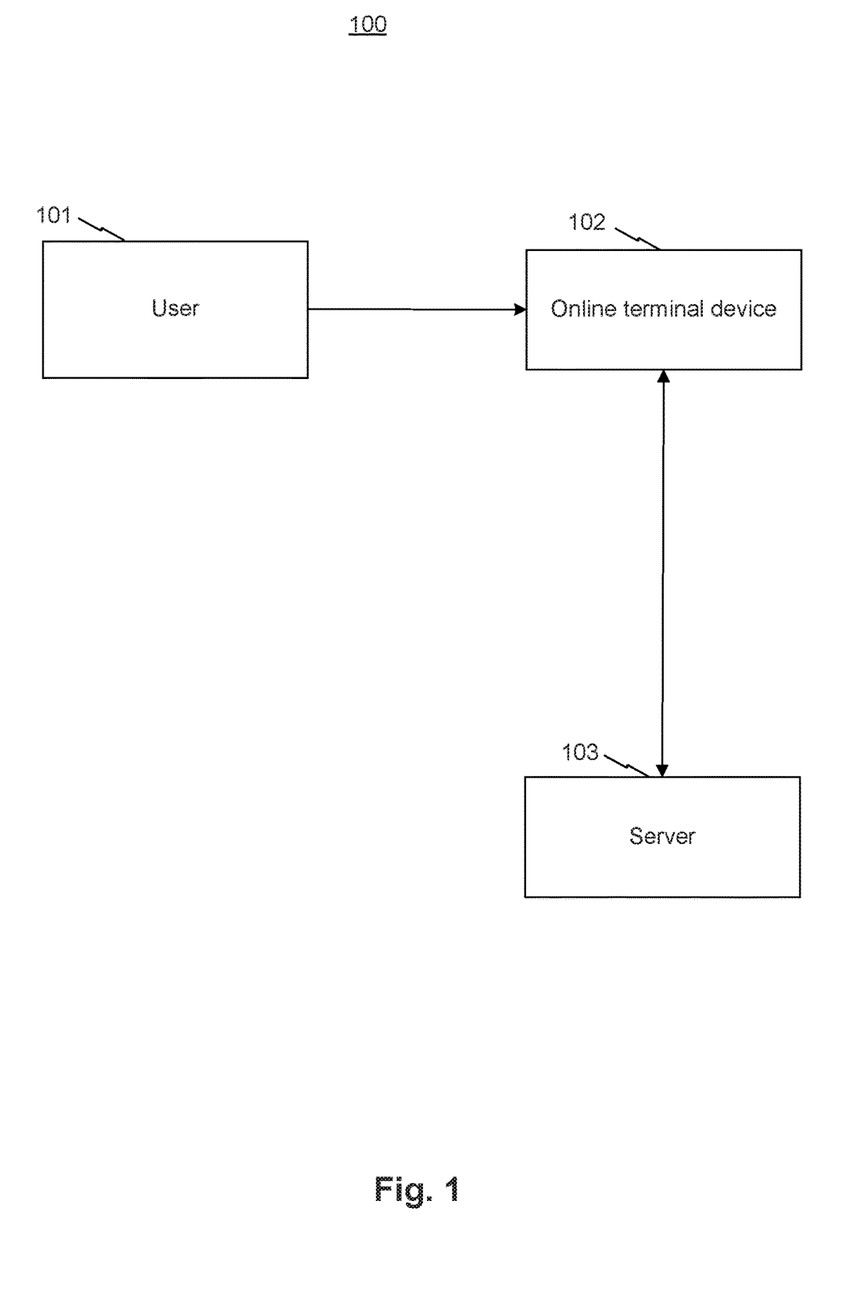
FIG. 1 is a block diagram illustrating a system for identity authentication, according to an exemplary embodiment.

FIG. 1 is a block diagram illustrating a system 100 for identity authentication, according to an exemplary embodiment. When a user 101 logs in a server 103 through an online terminal device 102, the server 103 can establish a credibility model based on neighbor network devices of the online terminal device 102 to identify the user. The online terminal device 102 may be a personal computer (PC) such as a desktop or laptop, a mobile device such as a smart phone, a tablet device, or any other electronic devices that can connect to the internet.

Figure 2:
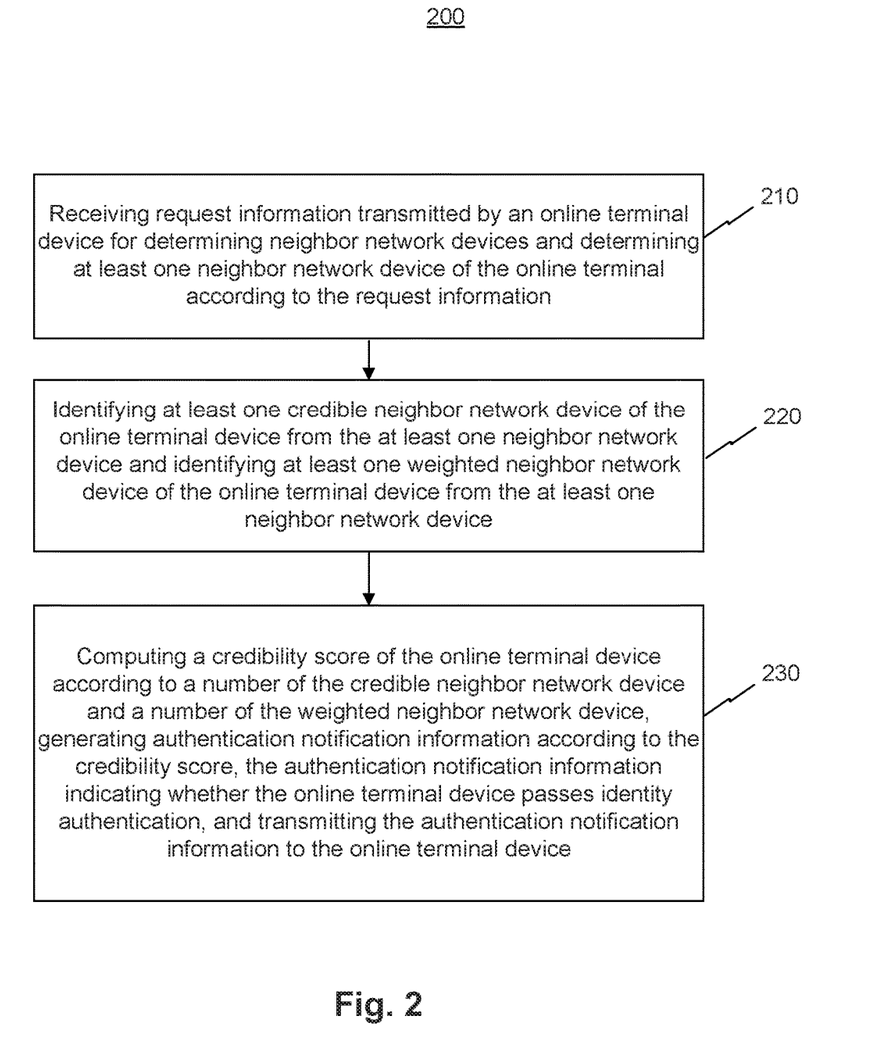
FIG. 2 is a flow diagram illustrating a method for identity authentication, according to an exemplary embodiment.

FIG. 2 shows a flow diagram of an identity authentication method 200, according to an exemplary embodiment. This embodiment will be described from a server side for realizing identity authentication. The method can be implemented by the server 103 in FIG. 1. The identity authentication method comprises:

Step 210: receiving request information transmitted by an online terminal device (e.g., online terminal device 102 in FIG. 1) for determining neighbor network devices, and determining at least one neighbor network device of the online terminal device according to the request information Step 220: identifying at least one credible neighbor network device of the online terminal device from the at least one neighbor network device and identifying at least one weighted neighbor network device of the online terminal device from the at least one neighbor network device.

In some embodiments, the online terminal device may not have any credible neighbor network device or weighted neighbor network device. Thus, the identifying result can be none. This scenario should be covered by the present application.

Step 230: computing a credibility score of the online terminal device according to a number of the identified credible neighbor network devices and a number of the identified weighted neighbor network devices, generating authentication notification information according to the credibility score, the authentication notification information indicating whether the online terminal device passes identity authentication, and transmitting the authentication notification information to the online terminal device.

As described above, in some embodiments, the online terminal device may not have any credible neighbor network device or weighted neighbor network device. Thus, the identifying result can be none and the number of the identified credible neighbor network device or the number of the identified weighted neighbor network device can be zero.

In one embodiment, step 210 may further comprise:

(1) Receiving routing detection request information transmitted by the online terminal device for determining neighbor network devices;

(2) Acquiring historic path records according to the routing detection request information and matching a current connection path of the online terminal device with historic paths in the historic path records to obtain a matching result;

(3) When the matching result exceeds a preset matching value, determining at least one device corresponding to the matching result to be one of the at least one neighbor network device of the online terminal device. The preset matching value can be set according to actual situations. For example, the preset matching value can be 90%.

In another embodiment, step 220 may comprise: calculating a number of occurrence that historic login accounts are matched with a neighbor network device and identifying the neighbor network device as one of the at least one credible neighbor network device of the online terminal device when the number of occurrence exceeds a preset occurrence time threshold. The preset occurrence time threshold can be set according actual situations. For example, the preset occurrence time threshold can be 10.

In another embodiment, step 220 further may comprise: when an account history shows that login times of a user on a neighbor network device exceed a preset login time threshold, determining the neighbor network device to be one of the at least one weighted neighbor network device of the online terminal device. The preset login time threshold can be set according actual situations. For example, the preset login time threshold can be 1.

In another embodiment, the credibility score of the online terminal device calculated in step 230 can be calculated by formula (1):

A credibility score of an online terminal device=A number of credible neighbor network device+A number of weighted neighbor network device.

When the credibility score of the online terminal device exceeds a preset credibility score threshold, the authentication notification information generated according to the credibility score of the online terminal device can indicate that the online terminal device has passed the identity authentication; and when the credibility score of the online terminal device does not exceed the preset credibility score threshold, the authentication notification information generated according to the credibility score of the online terminal device can indicate that the online terminal device has not passed the identity authentication. The preset credibility score threshold can be set according to actual situations.

By identifying the at least one credible neighbor network device of the online terminal device and the at least one weighted neighbor network device of the online terminal device, computing the credibility score of the online terminal device according to the number of the credible neighbor network device and the number of the weighted neighbor network device, and generating the authentication notification information according to the computed credibility score, the identification authentication of the online terminal device is realized based on neighbor network devices of the online terminal device. The authentication efficiency is improved, the authentication range is widened, and the identity of the user can also be identified according to the neighborhood relation with the device which is not bound with the user even though the device bound by the user is changed.

Figure 3:
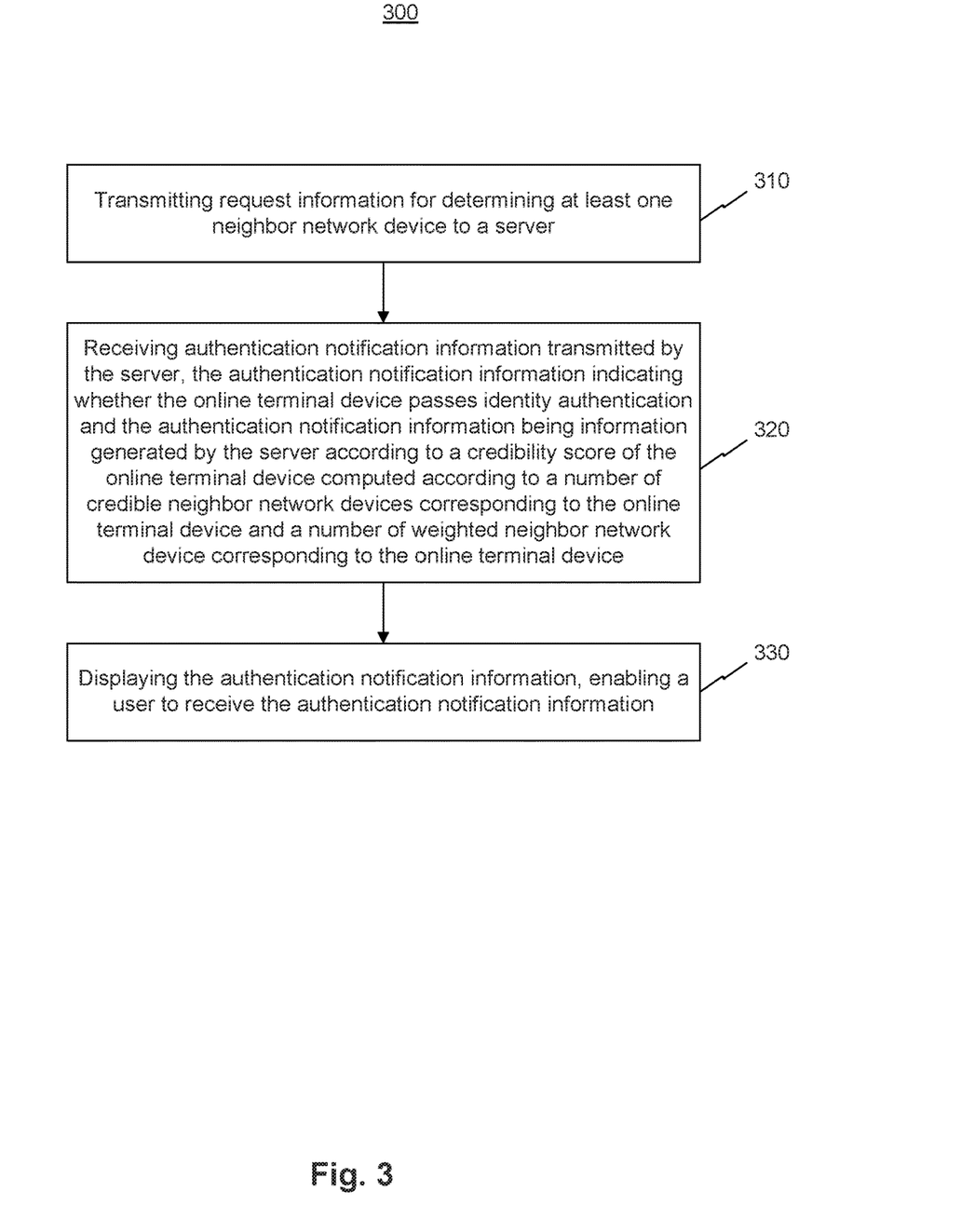
FIG. 3 is a flow diagram illustrating another method for identity authentication, according to an exemplary embodiment.

FIG. 3 a flow diagram of another embodiment of an identity authentication method 300, according to an exemplary embodiment. This embodiment will be described from a terminal device side for realizing identity authentication. The method may comprise:

Step 310: transmitting request information for determining at least one neighbor network device thereof to a server.

Step 320: receiving authentication notification information transmitted by the server, the authentication notification information indicating whether the online terminal device passes identity authentication and the authentication notification information being information generated by the server according to a credibility score of the online terminal device computed according to a number of credible neighbor network device corresponding to the online terminal device and a number of weighted neighbor network device corresponding to the online terminal device.

Step 330: displaying the authentication notification information or enabling a user to receive the authentication notification information by other means.

In one embodiment, step 310 may comprise: transmitting routing detection request information for determining the neighbor network devices to the server, enabling the server to determine the neighbor network devices of the online terminal device according to the routing detection request information.

In another embodiment, step 310 may comprise:

(1) Broadcasting an address resolution protocol (ARP) request message.

(2) Receiving an ARP reply message transmitted by at least one replying device in the same broadcast domain as the online terminal device, the ARP reply message carrying a hardware MAC (Medium Access Control) address of the replying device.

(3) Transmitting the request information carrying the MAC address to the server, enabling the server to determine a device corresponding to the received MAC address to be one of the neighbor network devices of the online terminal device.

In another embodiment, step 310 may comprise:

(1) Searching for an adjacent wireless local network (WLAN) to obtain a service set identifier (SSID) of the WLAN.

(2) Transmitting the request information carrying the SSID to the server, enabling the server to determine the WLAN having the SSID to be one of the neighbor network devices of the online terminal device.

In another embodiment, step 310 may comprise:

(1) If a current network of the online terminal device is a Global System for Mobile Communications (GSM) network, acquiring base station information of a base station adjacent to a current connection point of the online terminal device.

(2) Transmitting the request information carrying the base station information to the server, enabling the server to determine the base station corresponding to the base station information to be one of the neighbor network devices of the online terminal device.

By transmitting the request information, which carries relevant information for determining the at least one neighbor network device, the server can determine the at least one neighbor network device of the online terminal device according to the request information and complete the identity authentication of the online terminal device. The authentication efficiency is improved, the authentication range is widened, and the identity of the user can also be identified according to the neighborhood relation with the terminal device which is not bound with the user even though the terminal device bound by the user is changed.

Corresponding to the embodiments of the identity authentication method, the present disclosure further provides embodiments of an identity authentication apparatus, a terminal device and a server.

Figure 4:
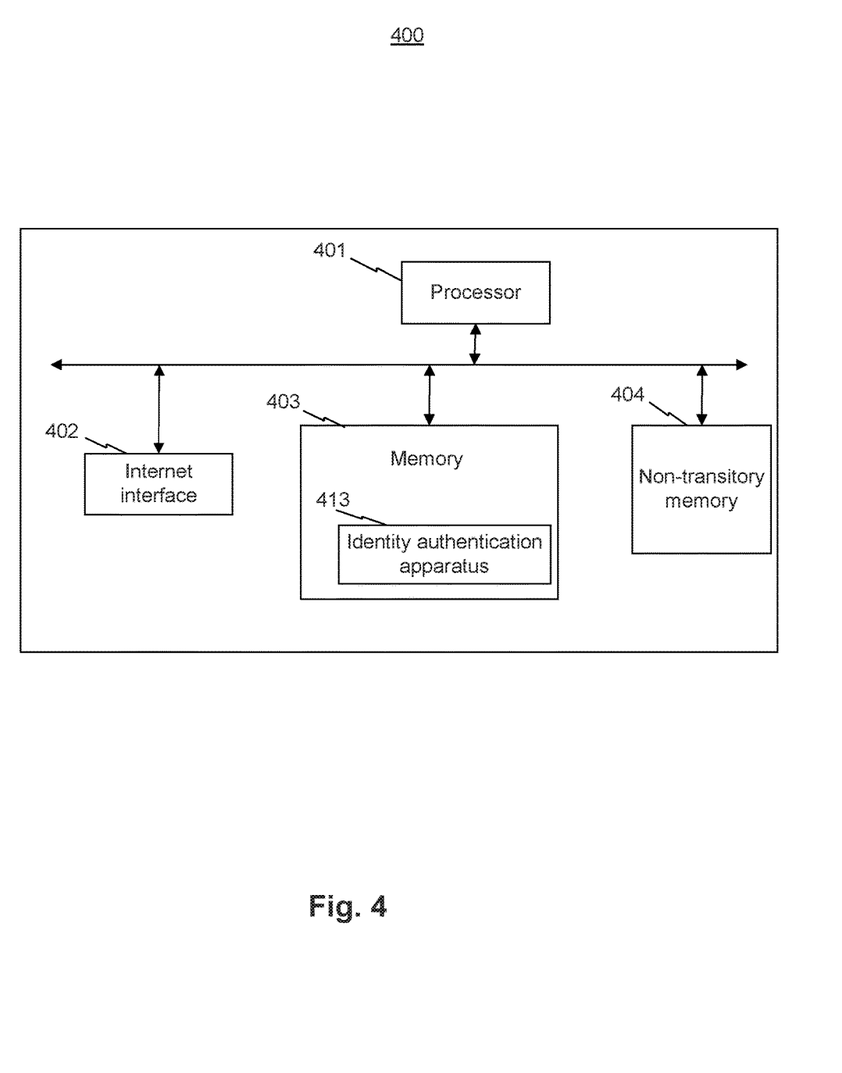
FIG. 4 is a block diagram illustrating a device for identity authentication, according to an exemplary embodiment.

The embodiments of the identity authentication apparatus of the present application can be respectively applied to the terminal device and the server. The embodiments of the apparatus can be realized by means of software and can also be realized by means of hardware or combination of software and hardware. For software, as a logical apparatus, it is realized by reading corresponding computer program instructions in non-transitory memories into internal memories for operation through a processor of a device in which the apparatus is located. FIG. 4 shows a hardware structure diagram of a device 400 with an identity authentication apparatus 413 according to the present application. In addition to a processor 401, the device can also include an internal memory 403, a network interface 402, and a non-transitory memory 404 as shown in FIG. 4. According to the actual functions of the device, the device can further include other hardware components. For example, if the device 400 is used as a terminal device, the device 400 may further include a camera, a touch screen, and communication components. If the device 400 is used as a server, the device may further include a forwarding chip responsible for processing messages.

Figure 5:
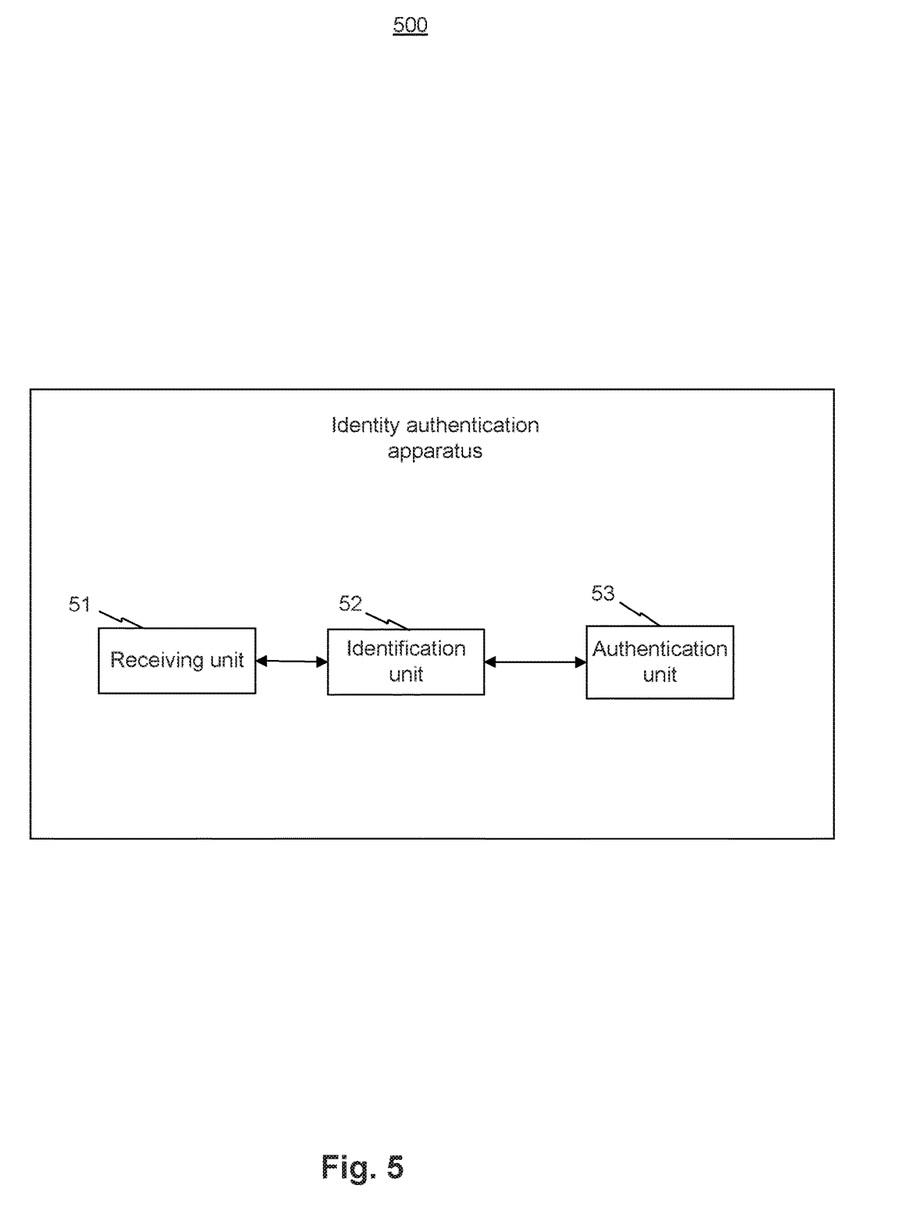
FIG. 5 is a block diagram illustrating an apparatus for identity authentication, according to an exemplary embodiment.

FIG. 5 is a block diagram illustrating an identity authentication apparatus 500, according to the present application. The identity authentication apparatus can be applied to a server and the apparatus comprises a receiving unit 51, an identification unit 52, and an authentication unit 53.

The receiving unit 51 is configured to receive request information transmitted by an online terminal device for determining neighbor network devices and to determine at least one neighbor network device of the online terminal device according to the request information.

The identification unit 52 is configured to identify at least one credible neighbor network device of the online terminal device from the at least one neighbor network device and to identify at least one weighted neighbor network device of the online terminal device from the at least one neighbor network device.

The authentication unit 53 is configured to compute a credibility score of the online terminal device according to a number of the credible neighbor network device and a number of the weighted neighbor network device, to generate authentication notification information according to the credibility score, the authentication notification information indicating whether the online terminal device passes identity authentication, and to transmit the authentication notification information to the online terminal device.

In another embodiment, the receiving unit 51 is further configured to:

receive routing detection request information transmitted by the online terminal device for determining neighbor network devices, acquire historic path records according to the routing detection request information and match a current connection path of the online terminal device with historic paths in the historic path records to obtain a matching result, and when the matching result exceeds a preset matching value, determine at least one device corresponding to the matching result to be the at least one neighbor network device of the online terminal device.

In another embodiment, the identification unit 52 is further configured to calculate a number of occurrence that historic login accounts are matched with a neighbor network device and identify the neighbor network device as one of the at least one credible neighbor of the online terminal device when the number of occurrence exceeds a preset occurrence time threshold.

In another embodiment, the identification unit 52 is further configured to, when an account history shows that login times of a user on a neighbor network device exceed a preset login time threshold, determine the neighbor network device to be one of the at least one weighted neighbor network device of the online terminal device.

In another embodiment, the credibility score of the online terminal device is equal to a sum of the number of the credible neighbor network device and the number of the weighted neighbor network device.

According to some embodiments, the authentication unit 53 is further configured to: when the credibility score exceeds a preset credibility threshold, generate the authentication notification information to indicate that the online terminal device has already passed the identity authentication; and when the credibility score does not exceed the preset credibility threshold, generate the authentication notification information to indicate that the online terminal device has not passed the identity authentication.

Figure 6:
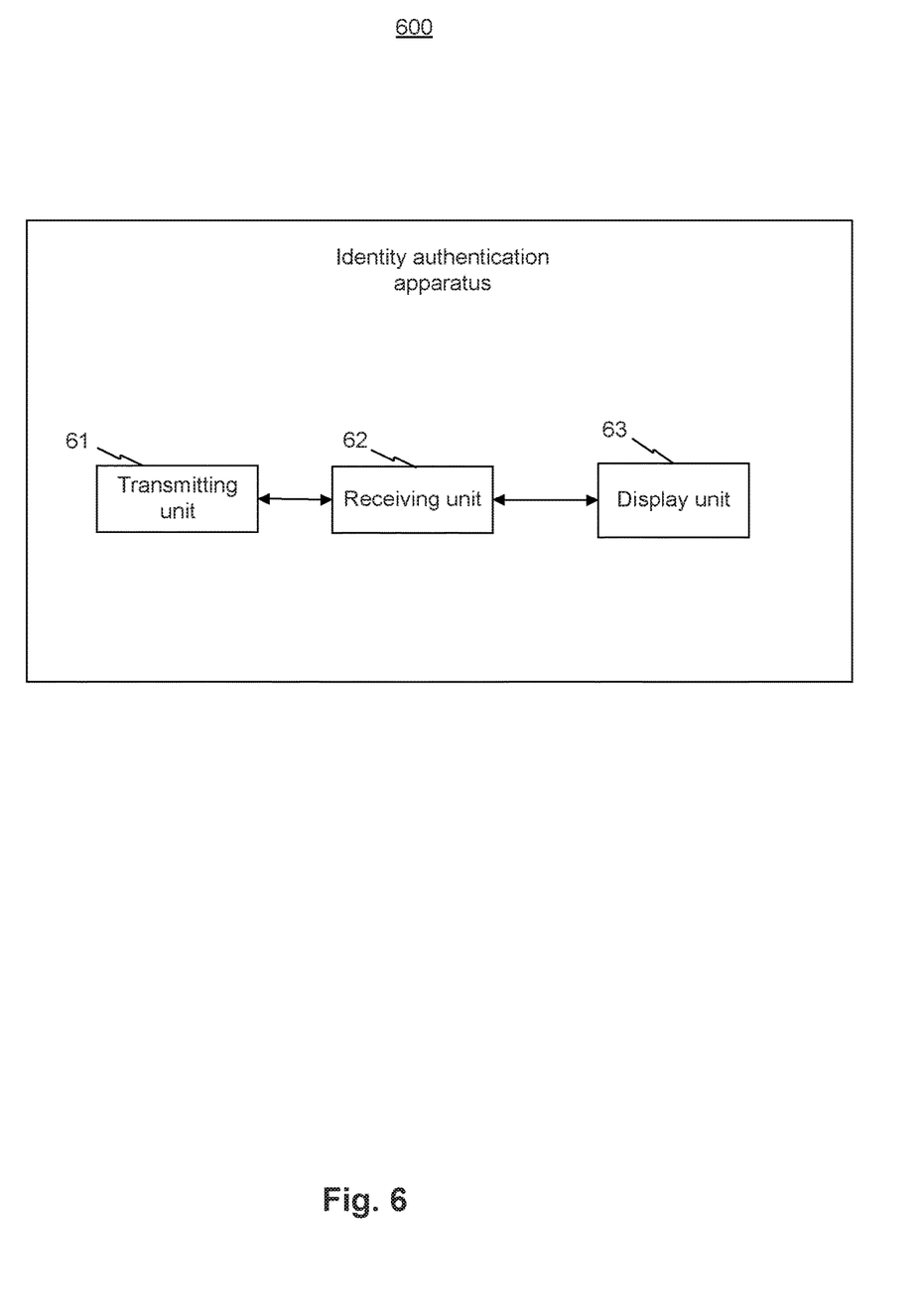
FIG. 6 is a block diagram illustrating another apparatus for identity authentication, according to an exemplary embodiment.

FIG. 6 shows a block diagram illustrating an identity authentication apparatus 600, according to the present application. The identity authentication apparatus can be applied to a terminal device and the apparatus comprises a transmitting unit 61, a receiving unit 62, and a display unit 63.

The transmitting unit 61 is configured to transmit request information for determining neighbor network devices to a server.

The receiving unit 62 is configured to receive authentication notification information transmitted by the server. The authentication notification information may indicate whether the online terminal device passes identity authentication. The authentication notification information is generated by the server according to a credibility score of the online terminal device computed according to a number of credible neighbor corresponding to the online terminal device and a number of weighted neighbor network device corresponding to the online terminal device.

The display unit 63 is configured to display the authentication notification information, enabling a user to receive the authentication notification information.

In another embodiment, the transmitting unit 61 is further configured to transmit routing detection request information for determining the neighbor network devices to the server, enabling the server to determine the at least one neighbor network device of the online terminal device according to the routing detection request information.

In another embodiment, the transmitting unit 61 is further configured to:

broadcast an address resolution protocol (ARP) request message;

receive an ARP reply message transmitted by at least one replying device in the same broadcast domain as the online terminal device, the ARP reply message carrying a hardware MAC address of the replying device; and transmit the request information carrying the MAC address to the server, enabling the server to determine a device corresponding to the received MAC address to be one of the at least one neighbor network device of the online terminal device.

In another embodiment, the transmitting unit 61 is further configured to search for an adjacent wireless local network (WLAN) to obtain a service set identifier (SSID) of the WLAN and transmit the request information carrying the SSID to the server, enabling the server to determine the WLAN with the SSID to be one of the at least one neighbor network device of the online terminal device.

In another embodiment, the transmitting unit 61 is further configured to:

if a current network of the online terminal device is a Global System for Mobile Communications (GSM) network, acquire base station information of a base station adjacent to a current connection point of the online terminal device; and transmit the request information carrying the base station information to the server, enabling the server to determine the base station corresponding to the base station information to be one of the at least one neighbor network device of the online terminal device.

For the detailed realization process of functions and roles of each unit in the above-mentioned apparatus, reference is made to the realization process of corresponding steps in the above-mentioned methods, which is not repetitively described here.

Since the embodiments of the apparatus substantially correspond to the embodiments of the methods, for relevant portions, reference can be made to the description of the corresponding portions of the embodiments of the methods. The described embodiments of the apparatus is just exemplary, wherein units which are described as separate components can be or can also be not physically separated, and parts illustrated as units can be or can also be not physical units, i.e., can be located at the same place or can also be distributed on a plurality of network units. The purposes of the solution of the present application can be realized by selecting partial or all modules/units thereof according to actual needs.

Some embodiments of the present disclosure further provide a server, which comprises: a processor, and a non-transitory computer-readable storage medium storing instructions that, when executed by the processor, cause the processor to:

receive request information transmitted by an online terminal device for determining neighbor network devices and determine at least one neighbor network device of the online terminal device according to the request information;

identify at least one credible neighbor network device of the online terminal device from the neighbor network device and identify at least one weighted neighbor network device of the online terminal device from the neighbor network device; and compute a credibility score of the online terminal device according to a number of the credible neighbor network device and a number of the weighted neighbor network device, generate authentication notification information according to the credibility score, the authentication notification information indicating whether the online terminal device passes identity authentication, and transmit the authentication notification information to the online terminal device.

The embodiments of the present disclosure further provide a terminal device, which comprises a processor, and a non-transitory computer-readable storage medium storing instructions that, when executed by the processor, cause the processor to:

transmit request information for determining neighbor network devices to a server;

receive authentication notification information transmitted by the server, the authentication notification information indicating whether the online terminal device passes identity authentication and the authentication notification information being information generated by the server according to a credibility score of the online terminal device computed according to a number of credible neighbor network device corresponding to the online terminal device and a number of weighted neighbor network device corresponding to the online terminal device; and display the authentication notification information, enabling a user to receive the authentication notification information.

In some embodiments, when the identity authentication is performed to the online terminal device, the online terminal device transmits the request information for determining the at least one neighbor network device thereof to the server; after the server receives the request information, the server determines the at least one neighbor network device of the online terminal device according to the request information, identifies the at least one credible neighbor network device of the online terminal device from the at least one neighbor network device, identifies the at least one weighted neighbor network device of the online terminal device from the at least one neighbor network device, computes the credibility score of the online terminal device according to the number of the credible neighbor network device and the number of the weighted neighbor network device, generates the authentication notification information which can indicate whether the online terminal device passes the identity authentication according to the computed a credibility score, and transmits the authentication notification information to the online terminal device; and after the online terminal device receives the authentication notification information, the online terminal device displays the authentication notification information to enable the user to know the authentication notification information, thereby realizing the computation of the credibility score of the online terminal device according to the network device adjacent to the online terminal device and completing the identity authentication of the online terminal device according to the credibility score of the online terminal device. Thus, the authentication efficiency can be improved, the authentication range can be widened, and the identity of the user can be identified according to the neighborhood relation with the device which is not bound with the user even though the device bound with the user is changed.

Some of the embodiments of the methods and apparatus described above use the number of credible neighbor network device and the number of weighted neighbor network device to determine whether the user passes the identity authentication. A person having ordinary skill in the art should appreciate that only one of the numbers can be used to determine identity authentication. For example, the identity authentication method can include receiving request information transmitted by an online terminal device for determining at least one neighbor network device of the online terminal device according to the request information, determining the at least one neighbor network device of the online terminal device according to the request information, determining a number of credible neighbor network device of the online terminal device from the at least one neighbor network device, and determining whether the online terminal device passes identity authentication based on the number of credible neighbor network device. For another example, the identity authentication method can include receiving request information transmitted by an online terminal device for determining at least one neighbor network device of the online terminal device according to the request information, determining the at least one neighbor network device of the online terminal device according to the request information, determining a number of weighted neighbor network device of the online terminal device from the at least one neighbor network device, and determining whether the online terminal device passes identity authentication based on the number of credible neighbor network device. Accordingly, the corresponding modules/units in the apparatus can be configured to implement the above-described methods by a processor executing software codes.

The specification has described methods, apparatus, and systems for identity authentication. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, non-transitory memory, hard drives, CD ROMs, DVDs, flash drives, disks, and any other known physical storage media. The modules/units described above may be implemented in a form of software, hardware, firmware, or any combination of software, hardware, and firmware. For examples, the modules/units may be implemented by a processor executing software instructions stored in the computer readable memories.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An identity authentication method, comprising:
receiving request information transmitted by an online terminal device for determining neighbor network devices and, determining at least one neighbor network device of the online terminal device according to the request information;
identifying one or more credible neighbor network devices of the online terminal device from the at least one neighbor network device and one or more weighted neighbor network devices of the online terminal device from the at least one neighbor network device; and
computing a credibility score of the online terminal device according to a number of the one or more credible neighbor network devices and a number of the one or more weighted neighbor network devices, generating authentication notification information according to the credibility score, the authentication notification information indicating whether the online terminal device passes identity authentication, and transmitting the authentication notification information to the online terminal device, wherein the number of the one or more credible neighbor network devices is a count of the credible neighbor network devices, and the number of the one or more weighted neighbor network devices is a count of the weighted neighbor network devices.

2. The method of claim 1, wherein receiving the request information transmitted by the online terminal device and determining the at least one neighbor network device of the online terminal device according to the request information comprises:
receiving routing detection request information transmitted by the online terminal device for determining neighbor network devices;
acquiring historic path records according to the routing detection request information and matching a current connection path of the online terminal device with historic paths in the historic path records to obtain a matching result; and if the matching result exceeds a preset value, determining a device corresponding to the matching result to be the at least one neighbor network device of the online terminal device.

3. The method of claim 1, wherein identifying the one or more credible neighbor network devices of the online terminal device from the at least one neighbor network device comprises calculating a number of occurrence that historic login accounts are matched with a neighbor network device and identifying the neighbor network device as a credible neighbor network device of the online terminal device when the number of occurrence exceeds a preset occurrence time threshold.

4. The method of claim 1, wherein identifying the one or more weighted neighbor network devices of the online terminal device from the at least one neighbor network device comprises, when an account history shows that login times of a user on a neighbor network device exceed a preset login time threshold, determining the neighbor network device to be one of the one or more weighted neighbor network devices of the online terminal device.

5. The method of claim 1, wherein computing the credibility score of the online terminal device according to the number of the one or more credible neighbor network devices and the number of the one or more weighted neighbor network devices comprises computing the credibility score to be a sum of the number of the credible neighbor network devices and the number of the weighted neighbor network devices.

6. The method of claim 1, further comprising:
determining, from the at least one neighbor network device, the number of the one or more credible neighbor network devices and the number of the one or more weighted neighbor network devices.

7. A method for identity authentication, comprising:
transmitting request information for determining at least one neighbor network device to a server;
receiving authentication notification information transmitted by the server, the authentication notification information indicating whether the online terminal device passes identity authentication and the authentication notification information being information generated by the server according to a credibility score of the online terminal device computed according to a number of credible neighbor network devices corresponding to the online terminal device and a number of weighted neighbor network devices corresponding to the online terminal device, wherein the server determines the number of credible neighbor network devices and the number of weighted neighbor network devices from the at least one neighbor network device, and wherein the number of the credible neighbor network devices is a count of the credible neighbor network devices, and the number of the weighted neighbor network devices is a count of the weighted neighbor network devices; and
displaying the authentication notification information.

8. The method of claim 7, wherein transmitting the request information comprises transmitting routing detection request information for determining the at least one neighbor network device to the server, enabling the server to determine the at least one neighbor network device of the online terminal device according to the routing detection request information.

9. The method of claim 7, wherein transmitting the request information comprises:

broadcasting an address resolution protocol (ARP) request message;
receiving an ARP reply message transmitted by at least one replying device in the same broadcast domain as the online terminal device, the ARP reply message carrying a hardware Medium Access Control (MAC) address of the replying device; and
transmitting the request information carrying the MAC address to the server, enabling the server to determine a device corresponding to the received MAC address to be one of the at least one neighbor network device of the online terminal device.

10. The method of claim 7, wherein transmitting the request information comprises:
searching for an adjacent wireless local network (WLAN) to obtain a service set identifier (SSID) of the WLAN; and
transmitting the request information carrying the SSID to the server, enabling the server to determine the WLAN having the SSID to be one of the at least one neighbor network device of the online terminal device.

11. The method of claim 7, wherein transmitting the request information comprises:
if a current network of the online terminal device is a Global System for Mobile Communications (GSM) network, acquiring base station information of a base station adjacent to a current connection point of the online terminal device; and
transmitting the request information carrying the base station information to the server, enabling the server to determine the base station corresponding to the base station information to be one of the at least one neighbor network device of the online terminal device.

12. An identity authentication apparatus, comprising:
a receiving unit configured to receive request information transmitted by an online terminal device for determining neighbor network devices and, determine at least one neighbor network device of the online terminal device according to the request information;
an identification unit configured to identify one or more credible neighbor network devices of the online terminal device from the at least one neighbor network device and one or more weighted neighbor network devices of the online terminal device from the at least one neighbor network device; and
an authentication unit configured to compute a credibility score of the online terminal device according to a number of the one or more credible neighbor network devices and a number of the one or more weighted neighbor network devices, to generate authentication notification information according to the credibility score, the authentication notification information indicating whether the online terminal device passes identity authentication, and to transmit the authentication notification information to the online terminal device, wherein the number of the one or more credible neighbor network devices is a count of the credible neighbor network devices, and the number of the one or more weighted neighbor network devices is a count of the weighted neighbor network devices.

13. The apparatus of claim 12, wherein the receiving unit is further configured to:
receive routing detection request information transmitted by the online terminal device for determining at least one neighbor network device;
acquire historic path records according to the routing detection request information and match a current connection path of the online terminal device with historic paths in the historic path records to obtain a matching result; and when the matching result exceeds a preset value, determine at least one device corresponding to the matching result to be the at least one neighbor network device of the online terminal device.

14. The apparatus of claim 12, wherein the identification unit is further configured to calculate a number of occurrence that historic login accounts are matched with a neighbor network device and identify the neighbor network device as one of the one or more credible neighbor network devices of the online terminal device when the number of occurrence exceeds a preset occurrence time threshold.

15. The apparatus of claim 12, wherein the identification unit is further configured to, when an account history shows that login times of a user on a neighbor network device exceed a preset login time threshold, determine the neighbor network device to be one of the one or more weighted neighbor network devices of the online terminal device.

16. The apparatus of claim 12, wherein the credibility score is a sum of the number of the one or more credible neighbor network devices and the number of the one or more weighted neighbor network devices; and wherein the authentication unit is further configured to:
when the credibility score exceeds a preset credibility threshold, generate the authentication notification information to indicate that the online terminal device has passed the identity authentication; and
when the credibility score does not exceed the preset credibility threshold, generate the authentication notification information to indicate that the online terminal device has not passed the identity authentication.

17. A server, comprising:
a processor; and
a non-transitory computer-readable storage medium storing instructions that, when executed by the processor, cause the processor to:
receive request information transmitted by an online terminal device to determine at least one neighbor network device of the online terminal device according to the request information;
identify one or more credible neighbor network devices of the online terminal device from the at least one neighbor network device and identify a one or more weighted neighbor network devices of the online terminal device from the at least one neighbor network device; and
compute a credibility score of the online terminal device according to a number of the one or more credible neighbor network devices and a number of the one or more weighted neighbor network devices, generate authentication notification information according to the credibility score, the authentication notification information indicating whether the online terminal device passes identity authentication, and transmit the authentication notification information to the online terminal device, wherein the number of the one or more credible neighbor network devices is a count of the credible neighbor network devices, and the number of the one or more weighted neighbor network devices is a count of the weighted neighbor network devices.

18. The server of claim 17, wherein the instructions that, when executed by the processor, cause the processor to identify one or more credible neighbor network devices of the online terminal device from the at least one neighbor network device and identify one or more weighted neighbor network devices of the online terminal device from the at least one neighbor network device comprises instructions that, when executed by the processor, cause the processor to:
calculate a number of occurrence that historic login accounts are matched with a neighbor network device and identify the neighbor network device as a credible neighbor network device of the online terminal device when the number of occurrence exceeds a preset occurrence time threshold.

19. The server of claim 17, wherein the instructions that, when executed by the processor, cause the processor to compute a credibility score of the online terminal device according to a number of the one or more credible neighbor network devices and a number of the weighted neighbor network devices comprises instructions that, when executed by the processor, cause the processor to:
compute the credibility score to be a sum of the number of the one or more credible neighbor network devices and the number of the weighted neighbor network devices.

20. An identity authentication method, comprising:
receiving request information transmitted by an online terminal device for determining at least one neighbor network device of the online terminal device according to the request information;
determining the at least one neighbor network device of the online terminal device according to the request information;
determining a number of one or more credible neighbor network devices of the online terminal device from the at least one neighbor network device, wherein the number of the one or more credible neighbor network devices is a count of the credible neighbor network devices; and
determining whether the online terminal device passes identity authentication based on the number of credible neighbor network devices.

21. An identity authentication method, comprising:
receiving request information transmitted by an online terminal device for determining at least one neighbor network device of the online terminal device according to the request information;
determining the at least one neighbor network device of the online terminal device according to the request information;
determining a number of one or more weighted neighbor network devices of the online terminal device from the at least one neighbor network device, wherein the number of the one or more weighted neighbor network devices is a count of the weighted neighbor network devices; and
determining whether the online terminal device passes identity authentication based on the number of credible neighbor network devices.

22. A non-transitory computer-readable storage medium having stored therein instructions that are executable by one or more processors of a server to cause the server to perform an identity authentication method comprising:
receiving request information transmitted by an online terminal device for determining neighbor network devices and, determining at least one neighbor network device of the online terminal device according to the request information;
identifying one or more credible neighbor network devices of the online terminal device from the at least one neighbor network device and one or more weighted neighbor network devices of the online terminal device from the at least one neighbor network device; and computing a credibility score of the online terminal device according to a number of the one or more credible neighbor network devices and a number of the one or more weighted neighbor network devices, generating authentication notification information according to the credibility score, the authentication notification information indicating whether the online terminal device passes identity authentication, and transmitting the authentication notification information to the online terminal device, wherein the number of the one or more credible neighbor network devices is a count of the credible neighbor network devices, and the number of the one or more weighted neighbor network devices is a count of the weighted neighbor network devices.

23. The non-transitory computer readable medium of claim 22, wherein the instructions are executable by the one or more processors of the server to cause the server to further perform:

receiving routing detection request information transmitted by the online terminal device for determining neighbor network devices;

acquiring historic path records according to the routing detection request information and matching a current connection path of the online terminal device with historic paths in the historic path records to obtain a matching result; and if the matching result exceeds a preset value, determining a device corresponding to the matching result to be the at least one neighbor network device of the online terminal device.

24. The non-transitory computer readable medium of claim 22, wherein the instructions are executable by the one or more processors of the server to cause the server to further perform:

calculating a number of occurrence that historic login accounts are matched with a neighbor network device and identifying the neighbor network device as a credible neighbor network device of the online terminal device when the number of occurrence exceeds a preset occurrence time threshold.

25. The non-transitory computer readable medium of claim 22, wherein the instructions are executable by the one or more processors of the server to cause the server to further perform:

when an account history shows that login times of a user on a neighbor network device exceed a preset login time threshold, determining the neighbor network device to be one of the one or more weighted neighbor network devices of the online terminal device.

26. The non-transitory computer readable medium of claim 22, wherein the instructions are executable by the one or more processors of the server to cause the server to further perform:

computing the credibility score to be a sum of the number of the one or more credible neighbor network devices and the number of the one or more weighted neighbor network devices.

27. A non-transitory computer-readable storage medium having stored therein instructions that are executable by one or more processors of an online terminal device to cause the online terminal device to perform an identity authentication method comprising:

transmitting request information for determining at least one neighbor network device to a server;

receiving authentication notification information transmitted by the server, the authentication notification information indicating whether the online terminal device passes identity authentication and the authentication notification information being information generated by the server according to a credibility score of the online terminal device computed according to a number of one or more credible neighbor network devices corresponding to the online terminal device and a number of weighted neighbor network devices corresponding to the online terminal device, wherein the number of the one or more credible neighbor network devices is a count of the credible neighbor network devices, and the number of the one or more weighted neighbor network devices is a count of the weighted neighbor network devices; and displaying the authentication notification information.

28. The non-transitory computer readable medium of claim 27, wherein the instructions are executable by the one or more processors of the online terminal device to cause the online terminal device to further perform:

transmitting routing detection request information for determining the at least one neighbor network device to the server, enabling the server to determine the at least one neighbor network device of the online terminal device according to the routing detection request information.

29. The non-transitory computer readable medium of claim 27, wherein the instructions are executable by the one or more processors of the online terminal device to cause the online terminal device to further perform:

broadcasting an address resolution protocol (ARP) request message;

receiving an ARP reply message transmitted by at least one replying device in the same broadcast domain as the online terminal device, the ARP reply message carrying a hardware Medium Access Control (MAC) address of the replying device; and transmitting the request information carrying the MAC address to the server, enabling the server to determine a device corresponding to the received MAC address to be one of the at least one neighbor network device of the online terminal device.

30. The non-transitory computer readable medium of claim 27, wherein the instructions are executable by the one or more processors of the online terminal device to cause the online terminal device to further perform:

searching for an adjacent wireless local network (WLAN) to obtain a service set identifier (SSID) of the WLAN; and transmitting the request information carrying the SSID to the server, enabling the server to determine the WLAN having the SSID to be one of the at least one neighbor network device of the online terminal device.

31. The non-transitory computer readable medium of claim 27, wherein the instructions are executable by the one or more processors of the online terminal device to cause the online terminal device to further perform:

if a current network of the online terminal device is a Global System for Mobile Communications (GSM) network, acquiring base station information of a base station adjacent to a current connection point of the online terminal device; and transmitting the request information carrying the base station information to the server, enabling the server to determine the base station corresponding to the base station information to be one of the at least one neighbor network device of the online terminal device.

* * * * *

UNITED STATES PATENT AND TRADEMARK OFFICE
CERTIFICATE OF CORRECTION

PATENT NO. : 10,237,272 B2  
APPLICATION NO. : 15/051478  
DATED : March 19, 2019  
INVENTOR(S) : Mian Huang et al.

Page 1 of 1

It is certified that error appears in the above-identified patent and that said Letters Patent is hereby corrected as shown below:

On the Title Page

Item (30), in the Foreign Application Priority Data:
"2015 1 0087898" should read as --201510087898.5--

Signed and Sealed this
Eighteenth Day of June, 2019

Andrei Iancu
*Director of the United States Patent and Trademark Office*